Sept. 24, 1957      W. F. SCHMIDT, JR      2,807,775

SELF-SATURATING REACTOR CIRCUIT

Filed July 28, 1952

INVENTOR.
WILLIAM F. SCHMIDT, JR.
BY
*Clement J. Paznokas*
ATTORNEY

United States Patent Office 2,807,775
Patented Sept. 24, 1957

2,807,775

SELF-SATURATING REACTOR CIRCUIT

William F. Schmidt, Jr., St. Johns, Mo., assignor to Vickers Incorporated, Detroit, Mich., a corporation of Michigan Application July 28, 1952, Serial No. 301,411

14 Claims. (Cl. 323—89)

This invention relates to power transmission and more particularly to self-saturating reactor circuits.

The term "self-saturating" has an accepted meaning in the magnetic amplifier art and refers to a circuit in which the reactance or power winding of the reactor is traversed by intermittent unidirectional currents from the power supply, for example the type of magnetic amplifier circuit in which the reactor power winding is in series with a half wave rectifier which, discounting rectifier leakage, allows intermittent unidirectional currents to flow in the reactance winding only during half of each cycle of alternating potential applied to the circuit, thereby providing a certain amount of residual flux in the reactor core during the nonconducting half cycle or inactive period of the rectifier. The flux condition of the core, i. e., its permeability or degree of magnetic saturation, during the nonconducting half cycle of the rectifier, determines the firing angle of the reactor during the conducting half cycle of the rectifier, and the firing angle determines the output of the reactor.

Generally, the reactor in such circuits is provided with a control winding traversed by the input signal or control current to generate M. M. F.'s either aiding or opposing the core flux during the nonconducting half cycle of the rectifier, i. e., in a saturating or desaturating direction, thereby increasing or decreasing the reactor output as desired. When pure direct current is used in the control winding, a particular reactor will have a certain output range from minimum to maximum output. However, it was found that when pulsed current, for example pulsed direct current such as full or half wave rectified alternating current, is employed in such control windings, the output range of the reactor is narrowed as compared to the range attained with the same values of pure direct current. Such circuits are particularly sensitive to the phase and width of the control pulses, especially where the pulses are narrower than a half cycle of the power supply frequency. When pulsed control currents are employed in the control winding of a self-saturating reactor circuit, they cause a rapid rate of change of flux in the core thereby inducing undesirable currents and voltages in the power winding of the reactor during the nonconducting half cycle of the associated rectifier. Because of the step-up ratio between the turns of the control and power windings, these induced currents and voltages are relatively high and produce E. M. F.'s which cause conduction through the self-saturating rectifiers producing M. M. F.'s in opposition to the control winding M. M. F.'s during the critical nonconducting half cycle. This condition is highly undesirable, especially when the reactor output is being driven downward. Under these conditions, cut-off or near cut-off of the reactor output can not be realized without the expenditure of excessive control power.

In accordance with the present invention, the undesirable conditions encountered with the use of pulsed control currents in self-saturating reactor circuits are substantially eliminated by providing a current path including a capacitor and reactor power windings connected in series opposition with respect to supply voltage fundamentals, and in which path currents induced by the control pulses circulate and produce M. M. F.'s which operate to reduce the rapid rate of change of the core flux due to pulsed control current, to broaden the base of control flux, and to aid the control pulse especially when the reactor output is being driven downward. The net effect is to extend the range of the reactor output to or nearer to cut-off than is normally attainable with pulsed control current in addition to substantially desensitizing the reactor to the width and phase of the control pulses.

It is therefore an object of this invention to provide a new and useful self-saturating reactor circuit.

Another object of the invention is to improve the control of a self-saturating reactor circuit especially in driving the reactor output downward when pulsed control is employed.

A further object of the invention is to substantially eliminate the undesirable currents and voltages induced in the power winding of a saturable reactor in a self-saturating circuit by pulsed control M. M. F.'s.

Another object is to prevent undesirable current flow through the saturating rectifier during its nonconducting half cycle when pulsed control is employed in a self-saturating reactor.

Another object is to substantially desensitize a self-saturating reactor circuit to width and phase of control pulses.

Another object of the invention is to prevent the rapid rate of change of core flux due to control M. M. F. pulses.

Further objects and advantages of the present invention will be apparent from the following description, reference being had to the accompanying drawings wherein a preferred form of the present invention is clearly shown.

Figure 1:
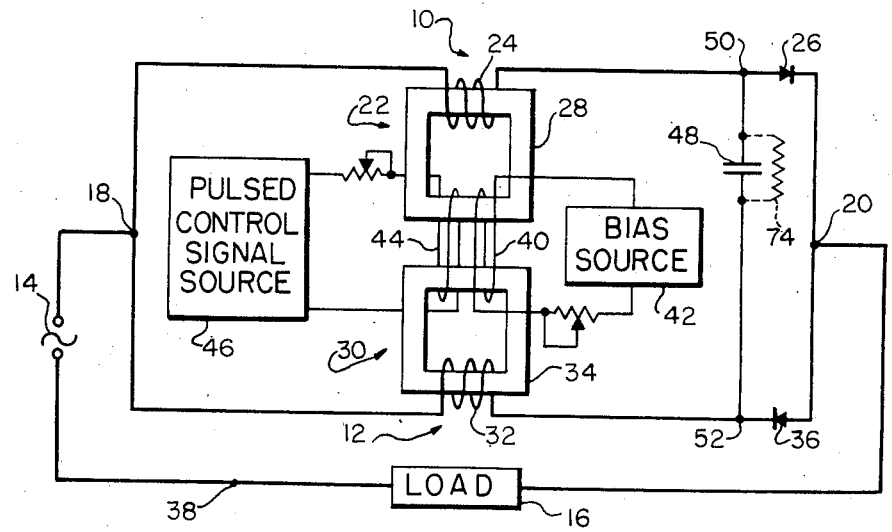
Figure 1 is a diagram illustrating one embodiment of the invention.

The circuit in Figure 1 includes two "parallel" but oppositely poled self-saturating reactor branches 10 and 12 connected between an alternating current supply source 14 and a load 16. Branch 10, connected between terminals 18 and 20 includes a saturable reactor 22 with a power winding 24 connected in series with a rectifier 26. The power winding 24 is carried by a magnetically saturable core 28. Branch 12 likewise connected between terminals 18 and 20, similarly includes a saturable reactor 30 with a power winding 32 on a saturable core 34, the power winding being connected in series with a rectifier 36. The rectifiers 26 and 36 are oppositely related so that one conducts on one half cycle of an applied alternating current while the other conducts in the opposite direction on the next half cycle, thus providing an alternating current output into the load 16 connected between output terminals 20 and 38. Terminals 18 and 38 are connected to the source of alternating current 14. Terminal 38 is a power input terminal for receiving alternating current from the supply 14, as well as an output terminal for the reactor circuit. The value of output current furnished to the load by each branch depends on the flux conditions of the reactor core in the branch.

Bias may be provided by a common bias winding 40 which links the cores 28 and 34 and is connected to a suitable bias source 42 for example, a source of direct current. Both cores are also linked by a control winding 44 connected to a source of pulsed current 46, for example pulsed direct current such as rectified alternating current.

Although cores 28 and 34 are described as separate cores with common control and bias windings, it will be apparent to those skilled in the art, that other core configurations and combinations may be used, for example a single three-legged core could be used to carry both power windings 24 and 32. Also the cores could be completely separate with separate control and bias windings on the respective cores. In such case the control windings of the two cores may be connected in series and to a source of control current. Likewise, the bias windings may be connected in series and to a source of bias current.

The circuit thus far described is conventional and its operation is well known. During one half cycle of the applied supply voltage, for instance the half cycle during which rectifier 26 is nonconductive and rectifier 36 is conductive, current will flow from the alternating current supply source 14 through the load 16, the rectifier 36 and the reactor power winding 32. On the opposite half cycle the rectifier 26 is conductive and current will flow to the load in the opposite direction through series branch 12 including the rectifier 26 and reactor power winding 24. The current flow in either direction depends on the voltage absorption of the respective reactor power winding which in turn is dependent upon the degree of magnetic saturation of its associated core section. The degree of core magnetization during the nonconductive period of the particular associated rectifier controls the firing angle of the reactor section involved. During this critical period the core saturation may be decreased or increased by adjusting the amplitude, or sense, or both, of the control current supplied to the control coil 44.

In the circuit thus far described, when the signal applied to the control winding 44 is pulsed, for example, a full wave or half wave rectified alternating current, undesirable currents and voltages, which produce M. M. F.'s in opposition to the control M. M. F.'s such as to reduce the effectiveness of the control M. M. F.'s are induced in the power windings 24 and 32 during their respective inoperative half cycles. To substantially eliminate these undesirable induced currents and voltages (variations in core flux due to control current) and to substantially desensitize the reactor to width and phase of control pulses in accordance with the present invention, there is provided a current path in which induced currents caused by the control pulses are allowed to flow. Included in the current path are the power windings 24 and 32 connected in a series circuit including a condenser 48, the power windings being connected in series opposition with respect to voltages of fundamental frequency derived from the alternating current power supply. Thus the power supply fundamentals induced in the windings 24 and 32 cancel out and only harmonics of the supply, and currents induced by the control pulses will flow in the current path.

The effect of the circulating currents induced in the power windings 24 and 32 during their respective inoperative periods by the pulsed control current is to charge and discharge the capacitor 48 during the respective nonconducting half cycle of each of the rectifiers 26 and 36, thereby setting up M. M. F.'s which combine with the control winding M. M. F.'s to produce a resultant control flux, with a broader base and a slower rate of change than the originally applied control M. M. F. pulses.

Figure 2:
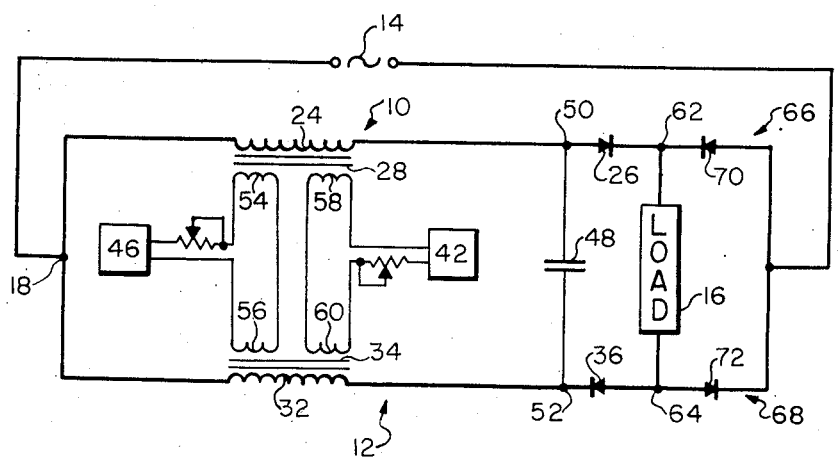
Figure 2 is a diagram showing another embodiment of the invention.

Figure 2 illustrates another type of self-saturating reactor circuit embodying features of the invention. This figure shows a bridge type circuit with a direct current output furnished to the load 16. This circuit incorporates the same parallel connected reactor setup shown in Figure 1 and also includes the capacitor 48. Again, it will be noted that the reactor power windings 24 and 32 are connected at one end to a common terminal 18 which in turn is connected to one side of an alternating current source 14. The cores 28 and 34 may carry separate control windings 54 and 56 and separate bias windings 58 and 60 or common control and bias windings such as those shown at 44 and 40 in Figure 1 may be employed. The control windings 54 and 56 are supplied from a source of control current 46. The bias windings 58 and 60 are connected to suitable source 42 of bias current. As in Figure 1, the rectifiers 26 and 36 in Figure 2 are oppositely related with respect to alternating current from the source 14 applied to the power input terminal 18. The bridge output terminals are indicated at 62 and 64 and are shown connected to the load 16.

In Figure 2 as in Figure 1 rectifier 26 and power winding 24 comprise a series circuit 10 between terminals 18 and 62, while rectifier 36 and power winding 32 are included in a series circuit 12 connected between terminals 18 and 64. The two series circuits form adjacent arms of the bridge and comprise two parallel circuits operable on opposite halves of the applied alternating current cycle. The other adjacent arms of the bridge are indicated at 66 and 68 and include rectifiers 70 and 72 respectively. As in Figure 1, the reactor windings 24 and 32 control opposite halves of the applied alternating current except that due to the bridge connection of the four rectifiers, a unidirectional current output is furnished to the load 16. The capacitor 48 in Figure 2 performs the same function as the capacitor in Figure 1 and is similarly connected in a series current path including the reactor power windings 24 and 32 connected in series opposition thus providing a path for currents induced by the control current M. M. F. pulses.

It will be seen that the relation of the special current path provided herein to the rest of the circuit results in an arrangement wherein the capacitor is substantially free of voltages thereacross of fundamental frequency derived from the supply voltage. This is due to the fact that the fundamental voltages induced in the output windings by the supply voltage is substantially the same and in series opposition in the current path which includes the capacitor. Thus, the connections on both sides of the capacitor (points 50 and 52) are at substantially the same potential with respect to fundamental frequencies derived from the supply voltage. The capacitor is thus connected between the power windings at points of the same potential with respect to fundamental frequencies derived from the supply voltage.

A high resistance may be shunted across the capacitor 48 to improve stability where the magnetic amplifier is unstable. Such a resistance is shown in a dotted line connection at 74 in Figure 1. This resistor has the effect of eliminating undesirable oscillations which may occur in the circuit. Such a resistor is especially effective in eliminating undesirable oscillations in case they occur when the present invention is applied to polyphase self-saturating reactor circuits. The resistor should not be of such a low value as to shunt out the charging and discharging of the capacitor in its current path as hereinbefore described.

The present invention is also effective in improving the output of a self-saturating reactor circuit employing alternating pulsed controls such as provided by alternating current pulses introduced in the control windings.

Although the particular embodiment disclosed herein employs a control winding for receiving pulsed control signals, it will be appreciated that the present invention is equally applicable in any case where the reactor output is controlled by pulsed currents regardless of the particular winding in which the control pulses are injected since it is the control M. M. F.'s pulses generated by the pulsed control current which cause the undesirable effect in self-saturating reactor circuits employing pulsed control.

While the form of embodiment of the invention as herein disclosed constitutes a preferred form it is to be understood that other forms might be adopted, all coming within the scope of the claims which follow.

What is claimed is as follows:

1. In a self-saturating reactor circuit having saturable core means, a pair of reactor power windings carried by said core means, and rectifier means connected to said power windings for self saturation, the combination therewith of a bidirectional current path including said power windings and a capacitor connected between said power windings at points having substantially the same potential with respect to fundamental frequencies derived in response to the application of supply voltages to said windings.

2. In a self-saturating reactor circuit having saturable core means, a pair of reactor power windings carried by said core means, and rectifier means connected to said power windings for self saturation, the combination therewith of a bidirectional current path including said power windings and a capacitor connected between said power windings at points having substantially the same potential with respect to fundamental frequencies derived in response to the application of supply voltages to said windings, and a resistor connected across said capacitor.

3. A self-saturating reactor circuit comprising a pair of saturable reactor power windings, rectifiers connected to said power windings for self saturation, and a bidirectional current path including said windings connected in series opposition with respect to voltages of fundamental frequency derived in response to the application of supply voltage to said windings, said current path including a series capacitor.

4. A self-saturating reactor circuit comprising a pair of saturable reactor windings, a conductor common to said windings, a rectifier connected in series with each winding for providing unidirectional intermittent currents thereto in response to the application of a supply voltage, said rectifiers being oppositely related with respect to said conductor whereby the rectifiers are operable to alternately conduct current through said conductor in opposite directions, and a bidirectional current path including said windings connected in series opposition with respect to voltages of fundamental frequencies derived from said supply voltage, said path including a series capacitor.

5. A self-saturating reactor circuit comprising a pair of saturable reactor windings, a conductor for passing current through both of said windings, a rectifier connected in series with each winding for providing unidirectional intermittent currents thereto in response to the application of a supply voltage, said rectifiers being oppositely related with respect to said conductor whereby the rectifiers are operable to alternately conduct current through said conductor in opposite directions, and a bidirectional current path including said windings connected in series opposition with respect to voltages of fundamental frequencies derived from said supply voltage, said path including a series capacitor, and a resistor connected across said capacitor.

6. A self-saturating reactor circuit comprising saturable reactor means including saturable core means and power windings, means in series with each power winding for subjecting the winding to unidirectional intermittent current in response to the application of a supply voltage, and means for reducing the rate of flux changes in said core means due to the application of pulsed control M. M. F.'s to said core means, said last means comprising a bidirectional current path including a series capacitor and said power windings so connected in series as to suppress fundamental voltages derived from said supply voltage.

7. In a self-saturating reactor circuit having saturable core means, a pair of reactor power windings and control means carried by said core means, a conductor common to said windings, and a rectifier connected in circuit with each power winding to provide self saturation in response to the application of a supply voltage to the circuit, the rectifiers being oppositely related with respect to said conductor whereby the rectifiers are operable to alternately conduct current through said conductor in opposite directions, the combination therewith of a current path excluding said rectifiers and including a capacitor and said power windings connected in series opposition with respect to voltages of fundamental frequency derived from said supply voltage.

8. A reactor control circuit comprising a pair of parallel connected self-saturating reactor branches, a conductor common to said branches, each including saturable reactor means with a reactor power winding, control means for subjecting the reactor means to control M. M. F.'s in response to the application of control current, and a rectifier for subjecting the power winding with unidirectional intermittent current in response to the application of supply voltage to the branch, said rectifiers being oppositely related with respect to said conductor whereby the rectifiers are operable to alternately conduct current through said conductor in opposite directions, and a current path excluding said rectifiers and including said power windings and a capacitor connected between said windings at points between the windings and the rectifiers.

9. A self-saturating reactor circuit comprising an input terminal for receiving a supply voltage, a pair of reactor power windings with one end of each coupled to said terminal, saturable core means linked with said power windings, means carried by said core means for receiving control currents, a rectifier in circuit with each power winding to provide unidirectional intermittent currents thereto in response to said supply voltage, said rectifiers being coupled to the other ends of said windings, said rectifiers being oppositely related with respect to said terminal whereby the rectifiers are operable to alternately conduct current through said terminal in opposite directions, and a closed current path including said power windings connected in series opposition with respect to fundamental frequencies derived from said supply current, said path including a capacitor connected between the other ends of said power windings at points between the other ends and said rectifiers.

10. A self-saturating reactor circuit comprising an input terminal for receiving a supply voltage, a pair of reactor power windings with one end of each coupled to said terminal, saturable core means linked with said power windings, means carried by said core means for receiving control currents, a rectifier in circuit with each power winding to provide unidirectional intermittent currents thereto in response to said supply voltage, said rectifiers being coupled to the other ends of said windings, said rectifiers being oppositely related with respect to said terminal whereby the rectifiers are operable to alternately conduct current through said terminal in opposite directions, and a closed current path including said power windings connected in series opposition with respect to fundamental frequencies derived from said supply current, said path including a capacitor connected between the other ends of said power windings at points between the other ends and said rectifiers, and a resistor connected across said capacitor.

11. A self-saturating reactor circuit comprising an input terminal for receiving supply current, a pair of parallel branches with one end of each connected to said terminal, each branch comprising a series circuit including a reactor power winding and a rectifier, said rectifiers being oppositely related with respect to said terminal to alternately conduct current through said terminal in opposite directions, saturable core means linked with said power windings, control winding means linked with said core means, said power windings being connected between said terminal and the rectifiers, and a capacitor connected between said power windings at points between the windings and the rectifiers.

12. In a self-saturating reactor circuit having an input terminal for receiving a supply voltage, a pair of reactor power windings with one end of each connected to said terminal, a rectifier connected to the other end of each power winding for providing unidirectional intermittent currents thereto in response to said supply voltage, said rectifiers being oppositely related with respect to said terminal to alternately conduct current through said terminal in opposite directions, and a capacitor connected between said windings at points of substantially the same potential with respect to fundamental voltages derived from said supply voltage whereby the capacitor forms a connecting link in a bidirectional closed current path including said windings.

13. A reactor circuit comprising: an input for receiving supply voltage; an output connectable to a load; a pair of self-saturating reactor branches for controlling current flow between said input and said output, said branches having a common junction; each branch including saturable core means, a reactor power winding carried by said core means, winding means carried by said core means for receiving control current, and a rectifier connected to one end of said power winding for providing unidirectional intermittent current thereto in response to the receipt of supply voltage at said input, said rectifiers being oppositely related with respect to said junction to alternately pass current through said junction in opposite directions, the other ends of the power windings being connected to said junction; and a bidirectional current path including said power windings and a capacitor connected between said power windings at points between the power windings and the rectifiers.

14. A reactor control circuit comprising input terminals for connection to a source of supply voltage, a pair of self-saturating reactor branches, one end of each connected to the same input terminal, each branch including in series and starting from said one end in the following order, a power winding of a saturable reactor and a one-way valve, said valves being oppositely related with respect to said terminal for alternately conducting current through said terminal in opposite directions, and a capacitor connected to both branches at points between the power winding and one-way valve of each branch.

References Cited in the file of this patent
UNITED STATES PATENTS

| | | |
|---|---|---|
| 1,997,179 | Logan | Apr. 9, 1935 |
| 2,573,818 | Votruba | Nov. 6, 1951 |
| 2,585,654 | Hewlett | Feb. 12, 1952 |
| 2,594,372 | Wattenberger | Apr. 29, 1952 |
| 2,653,293 | Huge | Sept. 22, 1953 |